United States Patent Office

3,070,556
Patented Dec. 25, 1962

3,070,556
PREPARATION OF CELLULAR POLYURETHANE PLASTICS
Rudolf Merten, Koln-Flittard, Hanswilli von Brachel, Koln-Sulz, Hans Holtschmidt, Koln-Stammheim, and Günther Hauptmann, Leverkusen, Germany, assignors to Farbenfabriken Bayer Aktiengesellschaft, Leverkusen, Germany, a corporation of Germany
No Drawing. Filed Nov. 10, 1959, Ser. No. 851,956
Claims priority, application Germany Nov. 12, 1958
10 Claims. (Cl. 260—2.5)

This invention relates generally to the preparation of polyurethanes and, more particularly, to an improved process for making cellular polyurethanes.

It has been proposed heretofore to prepare a cellular polyurethane plastic by a process wherein an organic polyisocyanate is reacted with an organic compound having at least two reactive hydrogens as determined by the Zerewitinoff method in the presence of a blowing agent. It has also been proposed to include in the reaction mixture a catalyst, an emulsifier and other additives which result in modification of the reaction rate and/or modification of the physical characteristics of the product. For example, it is possible to predetermine the elasticity of the product by the proper selection of reactive components and modifiers. The product, depending upon the components chosen, can be very soft and elastic and thus suitable for cushions and the like, or, at the other extreme, it can be a hard rigid product suitable for making insulation and the like. It has also been proposed to include a dimethyl siloxane in the reaction mixture to properly control the structure and cell size of the product. These silicone oils also tend to stabilize the foam mixture but it has been found that the heretofore available formulations for making a cellular product are very sensitive and that it is necessary to measure carefully each component in order that the product will have the desired physical characteristics.

It is, therefore, an object of this invention to provide a process for making a cellular polyurethane from known chemical reactants but devoid of the foregoing disadvantages of heretofore known processes. Another object of the invention is to provide a method for making a cellular polyurethane in which slight variations from the ideal formulation can be tolerated without a material change in physical characteristics of the product. Still another object of the invention is to provide an improved method for stabilizing a reaction mixture adapted to form a cellular polyurethane. A further object of the invention is to provide an improved process for making a cellular polyurethane from a polyhydric polyalkylene ether without the necessity of first forming a prepolymer and then reacting this prepolymer with water to form the cellular product. A more specific object of the invention is to provide an improved method of stabilizing a reaction mixture containing a polyhydric polyalkylene ether, an organic polyisocyanate and water or other suitable blowing agent and adapted to form upon chemical reaction a cellular polyurethane plastic.

The foregoing objects and others, which become apparent from the following description, are accomplished, generally speaking, by providing a process for making a solidified cellular polyurethane wherein an organo slicone fluid having at least one amino group is included in the reaction mixture before any substantial amount of chemical reaction involving the organic polyisocyanate has occurred. The invention thus contemplates a process for making a cellular polyurethane plastic in which any conventional organic compound having at least two reactive hydrogen atoms as determined by the Zerewitinoff method and an organic polyisocyanate are reacted together in the presence of a blowing agent in a reaction mixture containing an organo silicone fluid having at least one amino group in the molecule. In a preferred embodiment of the invention, an organic compound having at least two reactive hydrogen atoms, a molecular weight of at least about 500, an hydroxyl equivalent of from about 100 to about 3000 and an acid number not substantially above about 10, an excess of organic polyisocyanate over that required to react with all of the reactive hydrogens and water are reacted while in admixture with an organo silicone fluid containing at least one amino group per molecule.

Any suitable organo silicone fluid having at least one amino group per molecule may be used for the purpose of this invention. The amino group may be either primary, secondary or tertiary and the compound may or may not include other groups containing reactive hydrogen atoms as determined by the Zerewitinoff method. If the amino group is either primary or secondary, the organo silicone fluid will become incorporated in the structure of the foam through reaction with an isocyanate. If the amino group is a tertiary amino group and the compound does not contain any other groups having a reactive hydrogen atom, the organo silicone fluid will act as a catalyst modifying the reaction rate of the other components as a cellular polyurethane is formed. If the compound having a tertiary amino group also has a reactive hydrogen-containing group, it will act both as a catalyst and reactant. The nitrogen of the amino group may be bonded directly to silicon or it may be bonded to a carbon atom or to a chain of carbon atoms which in turn is connected to a silicon atom or through an oxygen atom to a silicon atom.

Examples of suitable organo silicone compounds containing at least one amino group include polymers prepared from silanes or from siloxanes. For example, a polymer prepared by polymerization of a monoalkyl trichlorosilane, a dialkyl dichlorosilane, a trialkyl monochlorosilane, a monoaryl trichlorosilane, a diaryl dichlorosilane or a triaryl monochlorosilane alone or while in admixture with excess ammonia, amine or amino alcohol, may be used. If the chlorosilane is polymerized alone, it is necessary to add the amino group after the polymer is formed by conventional methods. However, it is possible to polymerize such chlorosilanes alone or in admixture with other chlorosilanes which already contain amino-substituted alkyl or aryl radicals. The silanes can also have wholly or partially alkoxy substituents instead of the alkyl radicals described. The alkyl group on the foregoing silanes may be methyl, ethyl, propyl, butyl, amyl, hexyl, heptyl, octyl, decyl or the like. The aryl radical can be phenyl, naphthyl or the like. The silane might contain both alkyl and aryl radicals if it contains two or less chloro atoms. In fact, the silane may contain other halogen constituents, such as bromine or fluorine, instead of chlorine, if desired. The polymerization is effected by known methods in which the chlorosilane is hydrolyzed and then polymerized.

Polysiloxanes containing at least one amino group may also be prepared by a polymerization process similar to that for polymerizing silanes but using instead a suitable haloalkyl siloxane, haloaryl siloxane, alkyl halosiloxane or aryl halosiloxane, as the starting material in the presence of ammonia, amines or amino alcohols. As is true in the case of the silanes prepared as described above, the polysiloxanes prepared in this way can have the amino group connected directly to the silicon atom where ammonia or an amine is used. The amino group is connected through an oxygen atom and an alkylene or arylene radical if an amino alcohol is used. The alkyl or aryl radical on the siloxanes used can be the same as those on the silanes described above. Suitable amines for introducing the amino group into the polymeric silane or siloxane are, for example, methylamine, ethylamine, propylamine, oleylamine, aniline, piperidine, piperazine, ethylene diamine, hexamethylene diamine and the like. Suitable amino alcohols are, for example, ethanolamine, diethanolamine, triethanolamine, N-methyl ethanolamine, N-butyl diethanolamine, hydroxy ethyl piperazine, hydroxy ethyl aniline, N-methoxy aniline, amino phenol, amino cresol, 3-amino butanol, 3-amino propanol, amino resorcin and the like.

A suitable procedure for reacting halosilanes and alkyl or aryl halosiloxanes with amino alcohols to give organo silicone compounds containing at least one amino group connected to the silicone atom through an oxygen atom and an alkylene or arylene radical is described in U. S. patent application Serial No. 849,735 filed by Hans Holtschmidt and Hanswilli von Brachel on October 30, 1959, now abandoned.

Polyamino alkoxy polysilanes can also be prepared from polyalkoxy polysiloxanes by transesterification with the same or similar amino alcohols. Polysiloxanes in which the nitrogen is connected through C-atoms to the silicon can, for example, be obtained by copolymerization of halo alkyl halosilanes with halo silanes and subsequent reaction of the halo alkyl polysiloxanes which are formed with ammonia, amines or amino alcohols.

Organo silicone fluids having both an amino group and a second group containing reactive hydrogens may be prepared by properly selecting the components used in the polymerization. One method for preparing such compounds is to react a suitable alkylene oxide with an organo silicone fluid which contains a primary or secondary amino group. Ethylene oxide, propylene oxide or the like may be used for this purpose and the organo silicone fluid having the primary or secondary amino group may be prepared by one of the polymerization processes described hereinbefore. Still another organo silicone fluid which can be used to advantage is an oxyalkylene blocked copolymer of the type described in U.S. Patent 2,834,748 after the said copolymer has been modified to contain at least one amino group.

Any suitable organic compound having at least two reactive hydrogens as determined by the Zerewitinoff method may be used in accordance with the process of this invention provided that the compound has a molecular weight of at least about 500, an hydroxyl equivalent of at least about 100 to about 3000, and an acid number of substantially not more than about 10. It is to be understood that "OH equivalent" as used herein and in the claims is meant the quantity of organic compound having at least two reactive hydrogens in grams which contains one mol of a functional group, i.e., —OH or —NHR wherein R is hydrogen, alkyl such as methyl or the like, or an aryl radical such as phenyl or the like. The organic compound having at least two reactive hydrogens may be a polyhydric polyether, such as a polyhydric polyalkylene ether prepared by condensation of an alkylene oxide, such as, for example, ethylene oxide, propylene oxide, butylene oxide, amylene oxide or the like, or epichlorohydrin alone or together with a polyhydric alcohol, such as ethylene glycol, propylene glycol, butylene glycol, trimethylol propane, glycerine, pentaerythritol, sorbitol, hexanetriol or the like. The polyhydric polyether might also contain phenylene radicals, such as one prepared by condensation of styrene oxide or by condensation of other suitable aromatic compounds. The alkylene oxides may also be condensed with sugar, phenols, such as, for example, hydroquinone, or 4,4′-dihydroxy diphenylmethane, or they may be condensed with a suitable amine, such as, for example, ethylene diamine, hexamethylene diamine, aniline, phenylene diamine or the like to produce a polyether suitable for use in accordance with this invention. Polyethers prepared by condensation of ethylene oxide, trimethylene oxide or by polymerization of tetrahydrofuran and containing primary hydroxyl groups and their adducts may also be used. Polythioethers prepared by condensation of a thioglycol, such as thiodiglycol, or by condensation of thiodiglycol with a suitable polyhydric alcohol, such as, for example, ethylene glycol, trimethylol propane, glycerine, pentaerythritol or the like, may be used. Polyacetals prepared by reaction of a polyhydric alcohol, such as, for example, one of those listed above and formaldehyde, may be used. Other examples of suitable organic compounds including reactive hydrogens are polyesters prepared by condensation of a suitable polycarboxylic acid with a suitable polyhydric alcohol. The polycarboxylic acid may be an aliphatic compound, such as, for example, adipic acid, succinic acid, sebacic acid, maleic acid or the like. It may be a suitable aromatic compound, such as, for example, phthalic anhydride, terephthalic acid, or the like. Any suitable polyhydric alcohol may be used in preparing the polyester, such as, for example, ethylene glycol, propylene glycol, trimethylol propane, diethylene glycol or other suitable polyalkylene glycols including polybutylene glycols or the like. The polycarboxylic acid may also be condensed with a suitable amino alcohol, such as, for example, triethanolamine, diethanolamine, N-methyl diethanolamine, or other suitable N-alkyl diethanolamines, or the like. Moreover, the polycarboxylic acid may be condensed with a mixture of polyhydric alcohols and amino alcohols. If desired, a mixture of organic compounds having reactive hydrogens may be used. In some embodiments, it is desirable to include with the organic compound having reactive hydrogens a second compound having at least two reactive hydrogens as determined by the Zerewitinoff method and having a molecular weight of less than about 500. Suitable compounds of this type are ethylene diamine, trimethylol propane, ethylene glycol, glycerine and the like.

Any suitable organic polyisocyanate, either aliphatic, araliphatic or aromatic, may be used. Examples of suitable organic polyisocyanates include meta-phenylene diisocyanate, paraphenylene diisocyanate, 2,4-toluylene diisocyanate, 2,6-toluylene diisocyanate, 4,4′-diphenylmethane diisocyanate, benzidine diisocyanate, naphthalene-1,5-diisocyanate, hexa-methylene diisocyanate, 4,4′,4″-triphenylmethane triisocyanate, decamethylene diisocyanate and the like. The addition product formed when a polyhydric alcohol, such as, for example, trimethylol propane, glycerine or the like, is reacted with a polyisocyanate may be used. Likewise, the reaction product of a polyisocyanate with an acetal as described in U.S. patent application Serial No. 821,360, filed June 19, 1959, or the polymers of a polyisocyanate including those described in German Patents 1,022,789 and 1,027,394 may be used. Each of the polyisocyanates may be used alone or in mixture.

The amount of organo silicone fluid containing at least one amino group per molecule will vary from formulation to formulation for best results but as a general rule more than a minor amount will seldom be used. In fact, it is preferred to include from about 0.001 percent to about 10 percent of the organo silicone fluid having at least one amino group per molecule in the reaction mixture. With some embodiments, for best results, from about 0.1 percent to about 5 percent should be used. The amount of organo silicone fluid specified herein is percent by weight based on the weight of the organic compound having at least two reactive hydrogens in the reaction mixture.

The manipulative steps involved in preparing the cellular polyurethane are the same as those used heretofore except for the incorporation of the organo silicone fluid in the reaction mixture. A suitable mixing device is disclosed in U.S. Patent Re. 24,514. This apparatus can be used to advantage for mixing the water, accelerators, emulsifiers, organic polyisocyanate and organic compound having at least two reactive hydrogens with the organo silicone fluid. Suitable accelerators include, for example, the tertiary amines, such as benzyl amine, N-methyl morpholine, N-ethyl morpholine, N,N'-dimethyl piperazine, N,N'-endoethylene piperazine, 1-methoxy-3-dimethyl amino propane, sodium phenolate, magnesium oxide, alkali alcoholates such as sodium methoxide, and the accelerates disclosed in U.S. Patent Re. 24,514. Suitable emulsifiers are also disclosed in U.S. Patent Re. 24,514. For example, the reaction mixture may contain pore size regulators, such as paraffin oils or the heretofore known silicone oils, such as the dimethyl siloxanes. Fillers, dye stuffs, plasticizers or the like may also be included. Likewise, metal catalysts, such as, for example, those disclosed in German Patent No. 958,774 and U.S. patent application Serial No. 678,437, filed August 15, 1957, and the like may be used.

In the following examples, the reactive components listed are mixed together either by introducing them into an apparatus of the type disclosed in U.S. Patent Re. 24,514 or by stirring them together by hand. The reaction mixture thus obtained may be poured into a suitable mold or other device where chemical reaction proceeds to form the product. As soon as the reactive mixture has been placed in the mold, foaming begins and the product quickly solidifies into a cellular mixture which is insensitive to shock during the hardening thereof and has no tendency to collapse.

Cellular polyurethane plastics provided by the process of this invention may be used for making upholstery, insulation, sponges, carpet underlay, both thermal and sound insulation or the like.

The invention is further illustrated by the following examples in which the parts are by weight unless otherwise indicated:

Example 1

About 100 parts of a polyhydric alkylene ether obtained by the condensation of propylene oxide with glycerine and having a molecular weight of about 3000 and an hydroxyl number of about 56 is combined with about 40 parts of an isomeric mixture of 65 percent 2,4-toluylene diisocyanate and 35 percent 2,6-toluylene diisocyanate, about 1 part of 1-ethoxy-3-dimethylamino-propane, about 3.2 parts water and about 1 part of a basic silicone fluid having the formula $$H_2N-CH_2CH_2-O-[Si(CH_3)_2O]_n-CH_2CH_2NH_2$$

wherein $n$ is about 9 obtained by the transesterification of the corresponding diethoxy compound, $$C_2H_5-O-[Si(CH_3)_2O]_n-C_2H_5$$

having a molecular weight of about 700 with about 2 mols of ethanolamine, in a machine mixer, such as is disclosed, for example, in U.S. Patent Re. 24,514 to Hoppe et al. issued August 12, 1958. The resulting mixture is inserted into a mold where foaming begins immediately and quickly solidifies into a cellular polyurethane which is insensitive to shock during the hardening thereof and has no tendency to collapse. If the basic silicone oil is not concurrently used or if the basic silicone oil is replaced by unmodified nitrogen-free silicone oil with a molecular weight of about 700, the cellular product collapses before it cures.

Example 2

About 100 parts of the polyhydric polyalkylene ether of Example 1 are combined with about 40 parts of the isomeric mixture of toluylene diisocyanate of Example 1, about 3.2 parts of water, about 1.5 parts of the basic silicone fluid of Example 1, about 0.8 part by volume of an activator mixture of about 2.88 parts of ferric acetylacetonate and about 16 parts of 1-ethoxy-3-dimethylaminopropane and about 20 parts of benzine in a machine mixer as disclosed in Example 1. The resulting mixture is inserted into a mold where foaming begins immediately and quickly solidifies into a cellular polyurethane which is insensitive to shock during the hardening thereof and has no tendency to collapse.

Example 3

About 100 parts of the polyhydric polyalkylene ether of Example 1 are combined with about 40 parts of the isomeric mixture of toluylene diisocyanates of Example 1, about 3.2 parts of water, about 1.5 parts of urotropine, about 0.7 part of 1-ethoxy-3-dimethylaminopropane, about 1 part of a nonbasic branched silicone fluid which represents a mixture of short chained homologous polymeric branched phenyl methyl siloxanes, and about 0.5 part of a basic silicone fluid prepared by the transesterification of the diethoxy polysiloxane mentioned in Example 1 with about 1 mol of triethanolamine is combined in a machine mixer as disclosed in Example 1. The resulting mixture is inserted into a mold where foaming begins immediately and quickly solidifies into a cellular polyurethane which is insensitive to shock during the hardening thereof and has no tendency to collapse.

Example 4

About 100 parts of a polypropylene ether glycol having a molecular weight of about 2000 and an hydroxyl number of about 56 are combined with 35 parts of the isomeric mixture of toluylene diisocyanates of Example 1, a solution of 0.7 part of N,N'-endoethylene piperazine and 2.8 parts water and about 1 part of a basic silicone fluid having the formula $$H_2N-CH_2CH_2O-[Si(CH_3)_2O]_n-CH_2CH_2NH_2$$

wherein $n$ is about 12 and a molecular weight of about 970 and obtained from dichloro polydimethyl siloxane and ethanolamine is combined in a machine mixer as disclosed in Example 1. The resulting mixture is inserted into a mold where foaming begins immediately and quickly solidifies into a cellular polyurethane which is insensitive to shock during the hardening thereof and has no tendency to collapse. Alternately, an analogous basic silicone fluid with a molecular weight of about 1350 may be used with equally satisfactory results.

Example 5

About 100 parts of the propylene ether glycol of Example 4 are combined with about 35 parts of a mixture of about 80 percent 2,4-toluylene diisocyanate and about 20 percent 2,6-toluylene diisocyanate, about 2 parts of sodium phenolate, about 1 part of 1-ethoxy-3-dimethylaminopropane, about 2.8 parts of water and about 1.5 parts of the basic silicone fluid of Example 4 in a machine mixer as disclosed in Example 1. The resulting mixture is inserted into a mold where foaming begins immediately and quickly solidifies into a cellular polyurethane which is insensitive to shock during the hardening thereof and has no tendency to collapse.

Example 6

About 100 parts of the polyhydric polyalkylene ether of Example 1 are combined with about 35 parts of the mixture of toluylene diisocyanates of Example 5, about 0.8 part of N,N'-endoethylene piperazine, about 2.7 parts of water and about 1.5 parts of a basic silicone fluid having the formula:

$$(HO-CH_2CH_2)_2N-CH_2CH_2-O-[Si(CH_3)_2O]_n-CH_2CH_2-N(CH_2CH_2OH)_2$$

obtained by the action of 4 mols of ethylene oxide on the basic silicone fluid of Example 1 in a machine mixer as disclosed in Example 1. The resulting mixture is inserted into a mold where foaming begins immediately and quickly solidifies into a cellular polyurethane which is insensitive to shock during the hardening thereof and has no tendency to collapse.

Example 7

About 50 parts of a moderately branched polyester obtained from adipic acid, diethylene glycol and trimethylolpropane having an hydroxyl number of about 59.5, an acid number of about 1.8 and a viscosity of about 17,500 centipoises at 25° C. are combined with about 50 parts of the polyhydric polyalkylene ether of Example 1, about 35 parts of the mixture of toluylene diisocyanates of Example 5, about 0.2 part of N,N'-endoethylene piperazine, about 2.8 parts water and about 4 parts of the basic silicone fluid of Example 4. The resulting mixture is inserted into a mold where foaming begins immediately and quickly solidifies into a cellular polyurethane which is insensitive to shock during the hardening thereof and has no tendency to collapse. If the basic silicone fluid is not concurrently employed or if it is replaced by a nitrogen-free copolymer of dimethyl dichloro siloxane and dimethyl dichloro silane having a molecular weight of about 1000, the cellular product collapses either during the blowing thereof or soon afterwards.

*Example 8*

About 50 parts of the polyester of Example 7 are combined with about 50 parts of the polyhydric polyalkylene ether of Example 1, about 35 parts of the mixture of toluylene diisocyanates of Example 5, about 0.2 part of N,N'-endoethylene piperazine, about 2.8 parts water and about 1.8 parts of a basic silicone oil having a molecular weight of about 1100 and the formula:

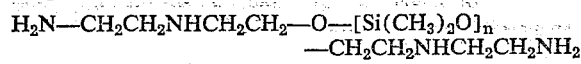

$$H_2N-CH_2CH_2NHCH_2CH_2-O-[Si(CH_3)_2O]_n$$
$$-CH_2CH_2NHCH_2CH_2NH_2$$

wherein $n$ corresponds to the molecular weight in a machine mixer as disclosed in Example 1. The resulting mixture is inserted into a mold where foaming begins immedately and quickly solidifies into a cellular polyurethane which is insensitive to shock during the hardening thereof and has no tendency to collapse.

*Example 9*

About 100 parts of the polypropylene ether glycol of Example 4 are combined with about 32 parts by volume of the mixture of toluylene diisocyanates of Example 5, about 1.5 to about 2.0 parts by volume of the basic silicone fluid of Example 4, about 0.5 part of N,N-endoethylene piperazine, about 0.05 part by volume of N-methyl-N'-(dimethylaminoethyl)-piperazine and about 2.9 parts by volume of water in a machine mixer as disclosed in Example 1. The resulting mixture is inserted into a mold where foaming begins immediately and quickly solidifies into a cellular polyurethane which is insensitive to shock during the hardening thereof and has no tendency to collapse.

*Example 10*

About 100 parts of the polypropylene ether glycol of Example 4, about 35.3 parts by volume of the mixture of toluylene diisocyanates of Example 5, about 1 part by volume of the basic silicone fluid of Example 4, about 0.5 part of N,N'-endoethylene piperazine, about 0.05 part by volume of N-methyl-N'-(dimethylamino ethyl)-piperazine and about 2.9 parts of water in a machine as is disclosed in Example 1. The resulting mixture is inserted into a mold where foaming begins immediately and quickly solidifies into a cellular polyurethane which is insensitive to shock during the hardening thereof and has no tendency to collapse.

It is to be understood that any other organic compound having reactive hydrogens, and other organic polyisocyanate, any other organo silicone fluid and any other modifying agent indicated to be suitable herein may be substituted for those used in the working examples. Moreover, the components set forth in the examples may be mixed by hand or in any other suitable manner.

It is preferred to include water in the reaction mixture along with unreacted organic polyisocyanate in order to produce carbon dioxide which results in the formation of the cellular product. However, it is also possible to form a cellular product using other blowing agents, such as, for example, trichlorofluoromethane, dichlorodifluoromethane, chlorotrifluoromethane and the like. It is preferred to use an excess of organic polyisocyanate over that required to react with all of the reactive hydrogens of the organic compound, such as, for example, the polyalkylene ether glycols. For best results, from about 1,1 mols to about 6 mols organic polyisocyanate per one mol of organic compound having reactive hydrogen is used. Preferably, from about 10 parts to about 100 parts by weight per 100 parts organic compounds having reactive hydrogens should be used. The organo silicone fluid preferably has a molecular weight of from about 300 to about 15000.

Although the invention has been described in considerable detail in the foregoing for the purpose of illustration, it is to be understood that such detail is solely for this purpose and that variations can be made therein by those skilled in the art without departing from the spirit and scope of the invention except as is set forth in the claims.

What is claimed is:

1. In the preparation of a cellular polyurethane plastic by a process which comprises reacting, in a reaction mixture containing a blowing agent, an organic polyisocyanate and an organic compound having at least two reactive hydrogens as determined by the Zerewitinoff method, a molecular weight of at least about 500, an OH equivalent of from about 100 to about 3000, and an acid number of not substantially more than about 10, said organic compound having reactive hydrogen being reactive with said polyisocyanate to form a polyurethane, said reaction mixture containing an excess of —NCO groups over that required to react with all of the reactive hydrogens of said organic compound, the improvement which comprises incorporating in said reaction mixture a member selected from the group consisting of an organopolysilane containing at least one amino group per molecule and an organopolysiloxane containing at least one amino group per molecule.

2. The process of claim 1 wherein from about 0.001 percent to about 10 percent by weight of said group member based on the weight of said organic compound having reactive hydrogens is incorporated in the reaction mixture.

3. The process of claim 1 wherein said group member is an organopolysilane.

4. The process of claim 1 wherein said group member is an organopolysiloxane.

5. The process of claim 1 wherein said organic compound having at least two reactive hydrogens is a polyhydric polyalkylene ether.

6. The process of claim 1 wherein said organic compound having at least two reactive hydrogens is a polyhydric polyalkylene ether and all of the components are mixed together substantially simultaneously.

7. The process of claim 1 wherein said amino group is a primary amino group.

8. The process of claim 1 wherein said amino group is a secondary amino group.

9. The process of claim 1 wherein said amino group is a tertiary amino group.

10. The process of Claim 1 wherein said group member contains at least one reactive hydrogen determined by the Zerewitinoff method in addition to any reactive hydrogen of said amino group.

References Cited in the file of this patent

UNITED STATES PATENTS

| | | |
|---|---|---|
| 2,901,445 | Harris | Aug. 25, 1959 |
| 2,902,456 | Gee et al. | Sept. 1, 1959 |